(12) United States Patent
Goldman et al.

(10) Patent No.: US 7,440,474 B1
(45) Date of Patent: Oct. 21, 2008

(54) METHOD AND APPARATUS FOR SYNCHRONIZING CLOCKS ON PACKET-SWITCHED NETWORKS

(75) Inventors: Peter David Goldman, Boulder, CO (US); Matthew Duane McShea, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 922 days.

(21) Appl. No.: 10/942,603

(22) Filed: Sep. 15, 2004

(51) Int. Cl.
*H04J 3/06* (2006.01)

(52) U.S. Cl. .................................. 370/503; 370/516

(58) Field of Classification Search ............... None
See application file for complete search history.

(56) References Cited

U.S. PATENT DOCUMENTS

| | | | | |
|---|---|---|---|---|
| 5,553,222 | A * | 9/1996 | Milne et al. | 715/201 |
| 7,114,091 | B2 * | 9/2006 | Vrancic | 713/400 |
| 2002/0018458 | A1 * | 2/2002 | Aiello et al. | 370/348 |
| 2005/0207387 | A1 * | 9/2005 | Middleton et al. | 370/347 |
| 2006/0056560 | A1 * | 3/2006 | Aweya et al. | 375/356 |
| 2006/0056563 | A1 * | 3/2006 | Aweya et al. | 375/376 |
| 2007/0153774 | A1 * | 7/2007 | Shay et al. | 370/352 |
| 2007/0258555 | A1 * | 11/2007 | Sidiropoulos | 375/371 |

OTHER PUBLICATIONS

Mills, David L., "RFC 1305 Network Time Protocol (Version 3) Specification, Implementation," Univ. of Delaware, Mar. 1992, pp. 1-108.

* cited by examiner

*Primary Examiner*—Ajit G Patel
(74) *Attorney, Agent, or Firm*—Sheridan Ross P.C.

(57) ABSTRACT

The present invention is directed to the synchronization of clock frequencies across packet data networks. In particular, one or more communication endpoints may produce a clock signal that is synchronized to a master clock source. Synchronization is performed by providing timing packets containing information regarding a number of clock cycles counted on the master clock source to a controlled clock source. The controlled clock source uses the provided count to increment a counter value. At the same time, the counter value on the controlled clock source is decremented by the controlled clock source clock. The resulting counter value is used to address a correction table. A correction value from the correction table is applied to the frequency control input of the controlled clock source clock.

32 Claims, 5 Drawing Sheets

Fig. 5

METHOD AND APPARATUS FOR SYNCHRONIZING CLOCKS ON PACKET-SWITCHED NETWORKS

FIELD OF THE INVENTION

The present invention is directed to synchronizing clocks maintained by devices in communication with one another over a packet-switched network. In particular, the present invention allows the clock frequency of one device to be synchronized to the clock frequency of another device using packet switched communications.

BACKGROUND OF THE INVENTION

In circuit switched environments, synchronization between connected devices is inherent to the underlying architecture. In particular, a dedicated talk and listen path is established between two end points, and data is exchanged in accordance with a single clock. The frequency of this clock may be communicated to connected devices using a dedicated clocking tree, in which a hierarchy of clocking devices is ultimately synchronized to the global positioning system, a highly accurate standalone clock, or some other external clock. However, communication endpoints on a packet-switched network, such as Voice over Internet protocol (VoIP) endpoints are considered connectionless because dedicated talk and listen paths are not established between the endpoints. Instead, data associated with a communication over an Internet protocol network is sent using packets that can traverse different paths between the two endpoints. Accordingly, the delay experienced by different packets can vary.

If the clocks on the endpoints to a communication session are not synchronized to one another, then one side may send more data packets then it is receiving. That is, each endpoint will take data from received packets at a rate determined by that endpoint's own clock. A receiving endpoint having a clock rate that is slower then a sending endpoint can therefore receive data packets more quickly than it processes them for playback. This can eventually result in data loss if the FIFO buffer of the receiving device overflows. For voice communication or other types of communication that rely heavily upon synchronization, such as modems and faxes, this variability can be detrimental to the endpoint's ability to operate within a tolerance level that is acceptable. Accordingly, it would be desirable to provide for the synchronization of clocks running on endpoints in communication with one another across an Internet protocol or other data packet network.

In order to synchronize the clocks on interconnected endpoints, systems have been developed that send data packets containing time stamps between the endpoints. This allows each endpoint to derive a clock that is, on average, the same frequency as the other side. In a typical implementation, the rate at which time stamps are sent is relatively slow. For example, time packets may be sent every few seconds. Furthermore, the time needed to lock the clock generator on one side of a communication session to the other is long. For example, hundreds of seconds are commonly required in order to establish clock frequencies on the interconnected devices that are on the average the same.

SUMMARY OF THE INVENTION

The present invention is directed to solving these and other problems and disadvantages of the prior art. In accordance with embodiments of the present invention, a first communication endpoint functions as a master clock source, while a second communication endpoint functions as a controlled or slave clock source. The controlled clock source receives data packets containing timing information, hereafter referred to as "timing packets," from the master clock source. The timing packets may include a master count value indicating the number of clock ticks that have accumulated in a master counter during a preceding time interval. The master count value is placed in a counter on the controlled clock source. For example, the received value may be added to the current value in the controlled clock source counter. The value held by the controlled clock source counter is also adjusted based on the output from the controlled clock source. For example, the value held by the controlled clock source counter may be decremented each time a clock pulse or tick is produced by the controlled clock source.

The value held by the controlled source counter is used to adjust the control input to the controlled clock source's clock signal generator or oscillator. For example, the value held by the counter on the controlled clock source may be used to address a correction value maintained in a table. The correction value thus obtained may then be applied to adjust the control input to the clock signal generator.

Timing packets containing count values may be sent to the controlled clock source periodically or intermittently. Furthermore, the value that the master counter must reach before the value held by that counter is reported in a timing packet sent to the controlled clock source can be regular or can be varied. Operation of the system allows the clock signal generated by the controlled clock source to converge to the frequency of the master clock source. Furthermore, the frequency of the clock signal generated by the controlled clock source converges towards the actual frequency of the master clock source, rather than an average of the two sources. Embodiments of the present invention additionally allow multiple controlled clock sources in communication with a master clock source over a packet data network to be converged to and controlled by the master clock source.

Additional features and advantages of the present invention will become more readily apparent from the following description, particularly when taken together with the accompanying drawings.

DETAILED DESCRIPTION

Figure 1:
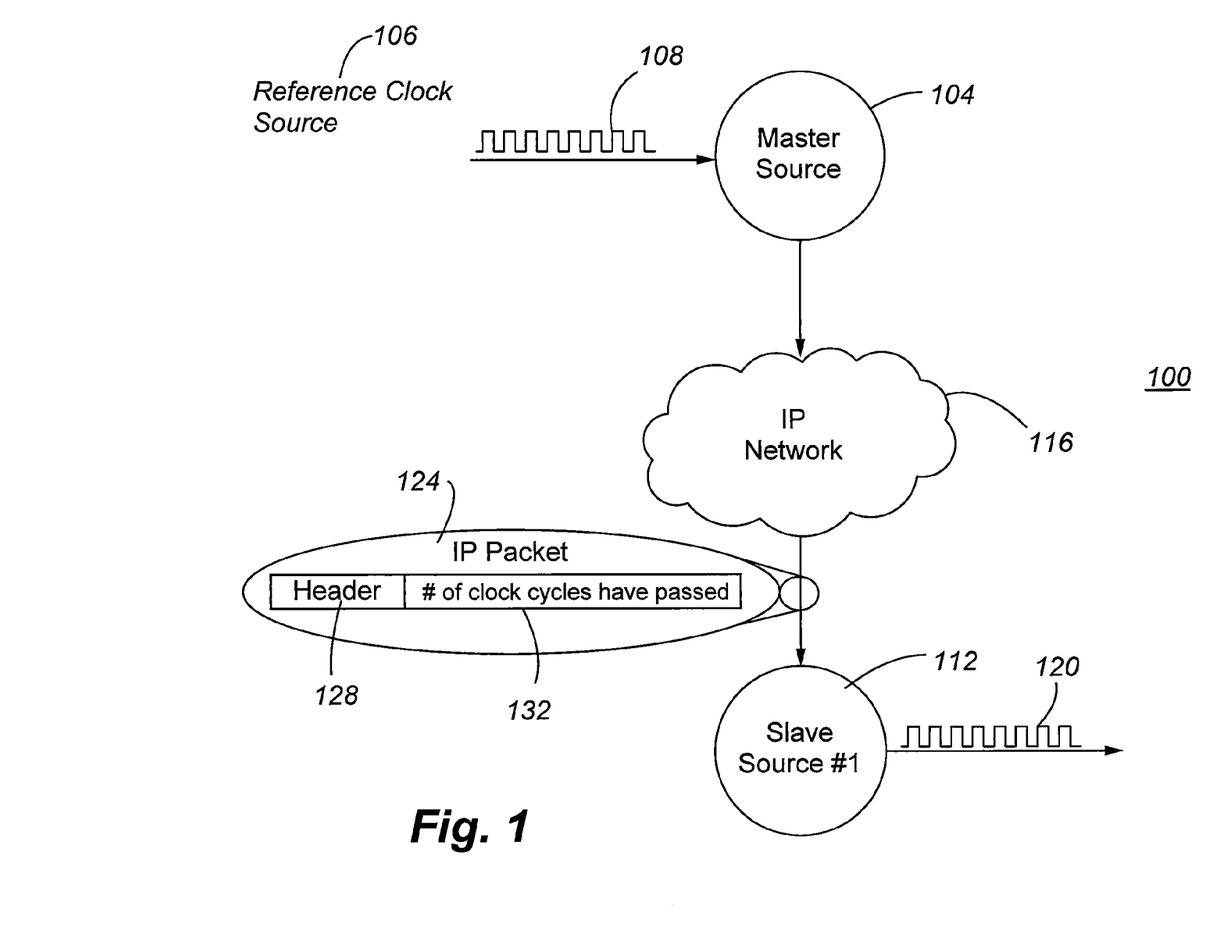
FIG. 1 is a schematic depiction of a system providing clock synchronization across a packet data network in accordance with embodiments of the present invention.

With reference now to FIG. 1, a system 100 in accordance with embodiments of the present invention that provides for the synchronization of a controlled clock source to a master clock source is depicted. The master clock source 104 is associated with a reference clock source 106 that provides a reference clock signal 108. The reference clock signal 108 can be a signal generated by a reference clock source 106 provided as part of the master source clock 104 itself. Alternatively, the reference clock signal 108 could be obtained from a global positioning system (GPS) source or an external clock source. The master clock source 104 is in communication with a controlled or slave clock source 112 across a packet data network 116. The controlled clock source 112 produces a clock signal 120 having a frequency that is synchronized or closely aligned with the frequency of the reference clock source signal 108 after operation of the system 100 has allowed the output frequencies of the controlled clock signal 120 to approach or match the frequency of the reference clock signal 108. As will be described in greater detail elsewhere herein, the master clock source 104 passes information regarding the frequency of the reference clock signal 108 to the controlled clock source 112 using timing packets 124. As used herein, a "timing packet" is any data packet that contains timing information related to the master source clock 104. The timing packets 124 include standard header information 128 and information regarding the number of reference clock source signal 108 cycles that have passed 132.

Figure 2:
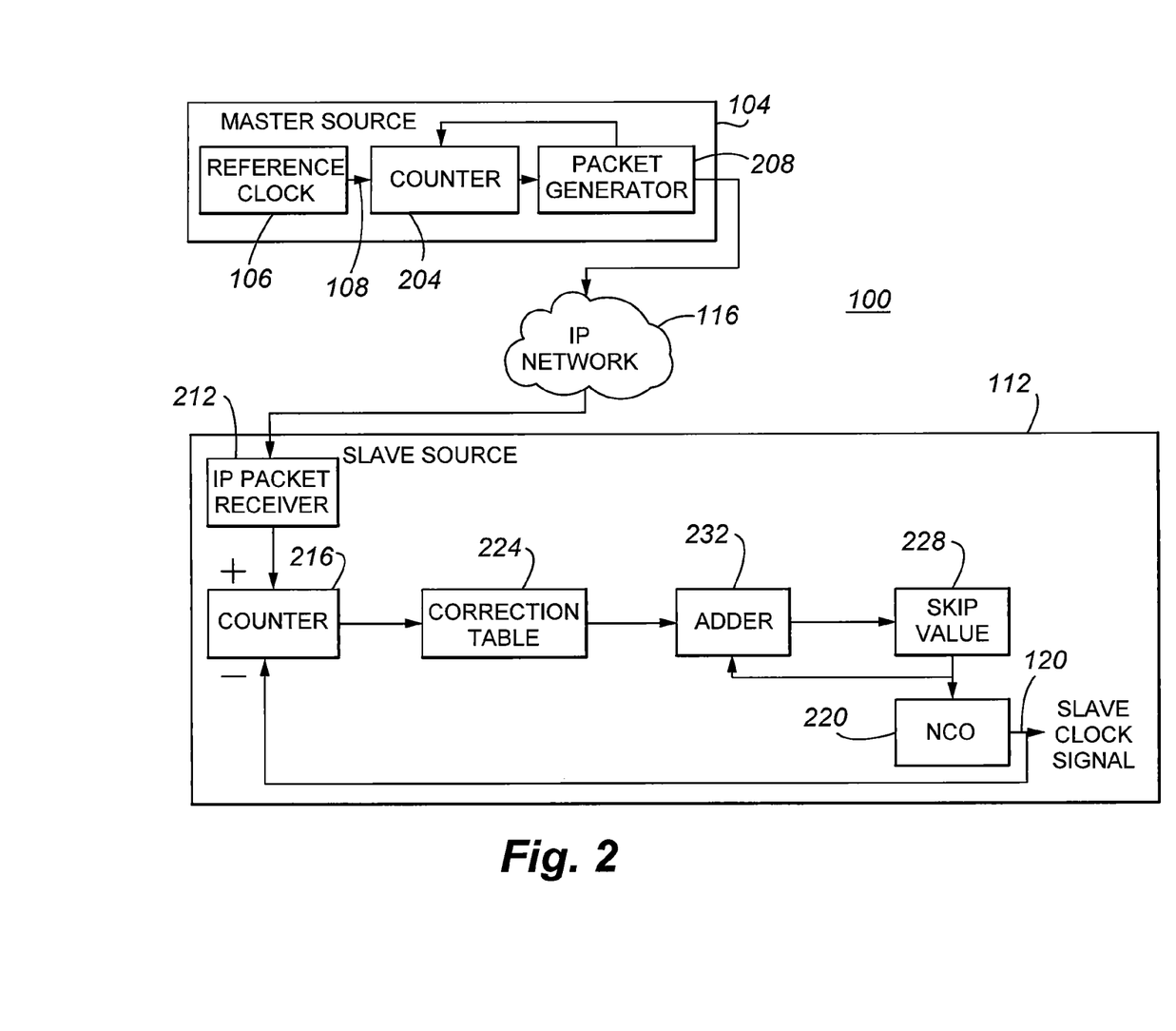
FIG. 2 is a block diagram depicting components of a system in accordance with embodiments of the present invention for providing clock synchronization across a packet data network.

With reference now to FIG. 2, components of a system 100 in accordance with embodiments of the present invention are depicted in greater detail. In particular, the master clock source 104 includes the reference clock source 106, a master counter 204, and a packet generator 208. As noted above, the reference clock 106 may comprise a clock or frequency generator that is local to the master clock source 104. Alternatively, the reference clock source 106 may comprise a clock signal received from an external source, such as a GPS device. The counter 204 is incremented each cycle or tick of the output 108 from the reference clock source 106. In accordance with alternative embodiments of the present invention, the master counter 204 may be incremented every k cycles or ticks received from the reference clock 106. Once the master counter 204 has reached a selected count value 132, that selected count value 132 is provided to the packet generator 208. In accordance with embodiments of the present invention, the selected count value may be a value m that is used consistently by a master clock source 104. As can be appreciated by one of skill in the art from the description provided herein, the value m is an integer multiple of the value k.

The packet generator 208 creates the timing packet 124 that is used to communicate the master clock source 104 timing information to the controlled clock source 112. Accordingly, the header 128 may include information addressing the timing packet 124 to the controlled clock source 112. In addition, the timing packet 124 created by the packet generator 208 includes the count value 132 (e.g., the value m) that the counter 204 has reached. The packet generator 208 also resets the counter 204. The counter will therefore again count the clock cycles output by the reference clock 106 as part of the reference clock signal 108 until the value m, or some other selected value, is reached, and again report that selected value to the packet generator 208.

The timing packet 124 is communicated to the controlled clock source 112 across the packet data network 116 over which the master clock source 104 and the controlled clock source 112 are in communication. The data packet network 116 may comprise a local area network, a wide area network, or a combination of networks. Accordingly, the packet data network 116 may comprise the Internet.

The controlled clock source 112 includes a data packet or Internet protocol packet receiver 212. The data packet receiver 212 accepts the timing packet 124 and extracts or strips out the value 132 representing the number of reference clock source 106 cycles that have been counted on the master clock source 104. As can be appreciated by one of skill in the art from the description provided herein, the count value 132 may be a count of the number of reference clock cycles counted on the master clock source 104 since communication between the master clock source 104 and the controlled clock source 112 was initiated. Subsequent timing packets 124 may then represent the number of reference clock cycles that have been counted since the previous timing packet 124 was sent.

The data packet receiver 212 provides the master count value to a counter 216 provided as part of the controlled clock source 112. In accordance with embodiments of the present invention, the master count value 132 is used to increment the counter 216. The controlled clock source counter 216 also receives as an input the clock signal 120 produced by a controlled clock signal generator 220, such as a numerically controlled oscillator, provided as part of the controlled clock source 112. In accordance with embodiments of the present invention, the value held by the controlled clock source counter 216 is decremented once per cycle or tick of the controlled clock source signal 120. Because the controlled clock source counter 216 is incremented based on the number of clock cycles that have passed on the master clock source 104 and is decremented based on the number of clock signals that have passed on the controlled clock source 112, whether the count value is increasing or decreasing over time provides information on the relative speed of both clock signals 108 and 120. For instance, in accordance with an exemplary embodiment in which the master count value increments the controlled clock source counter 216 and the controlled clock signal 120 decrements the controlled clock source counter 216, the master clock source 104 has a faster clock if the value held by the controlled clock source counter 216 increases over time. Alternatively, if the value held by the controlled clock source counter 216 is decreasing over time, then the controlled source clock signal 120 is faster than the reference clock signal 108.

The value held by the controlled clock source counter 216 is used to derive a correction value. In accordance with embodiments of the present invention, the value held by the controlled clock source counter 216 is used to address an error correction table 224. As can be appreciated by one of skill in the art, if the controlled clock source counter 216 has n bits, the error correction table 224 may be provided with $2^n$ correction value entries. Alternatively, a smaller error correction table 224 may be provided by truncating one or more of the least significant counter bits. By initially setting the controlled clock source counter 216 to a value that is at or about ½ the counter's 216 maximum possible value, the center or middle correction value address of the error correction table 224 is pointed to initially. Furthermore, the error correction value at the address comprising the center of the error correction table 224 may be set to zero, with incrementing positive values in the top half of the remaining addresses and decrementing negative values in the bottom half of the remaining addresses, it can be appreciated that the further the count value held by the controlled clock source counter 216 is from the middle value, the greater the error correction value or frequency correction factor can be. As can be appreciated by one of skill in the art from the description provided herein, the error correction values contained in the error correction table 224 do not need to follow a linear progression. For example, the error correction values may follow an exponential function.

The controlled clock source 112 additionally includes a skip value register 228 that holds a value used to control the frequency output by the controlled clock source clock generator 220. In accordance with embodiments of the present invention, the initial value maintained in the skip value register 228 may be selected so that the clock signal 120 produced by the controlled clock signal generator 220 is at or about the expected frequency of the signal 108 provided by the reference clock generator 106.

The current value held in the skip value register 228 is provided as an input to an adder 232. In addition, the current error correction value (i.e., the error correction value addressed by the controlled clock source counter 216) is also provided as an input to the adder 232. The adder 232 then combines the current value maintained in the skip value register 228 with the current error correction value provided by the error correction table 224 to produce a corrected skip value. That corrected skip value is then placed in the skip value register 228. The change to the skip value held by the skip value register 228 results in a change to the frequency of the controlled clock source signal 120 produced by the controlled clock source generator 220.

In accordance with embodiments of the present invention, the error correction value may be updated periodically. For example, the error correction value may be updated after each timing packet 124 containing a count value 132 is received. Alternatively, the error correction value may be updated after a number of timing packets 124, each containing a count value 132, are received. By updating the error correction value obtained from the correction table 224 periodically, a more stable output frequency may be obtained, because continuous changes to the skip value 228 and therefore the frequency of the controlled clock signal 120 from the controlled clock signal generator 220 are avoided.

Figure 3:
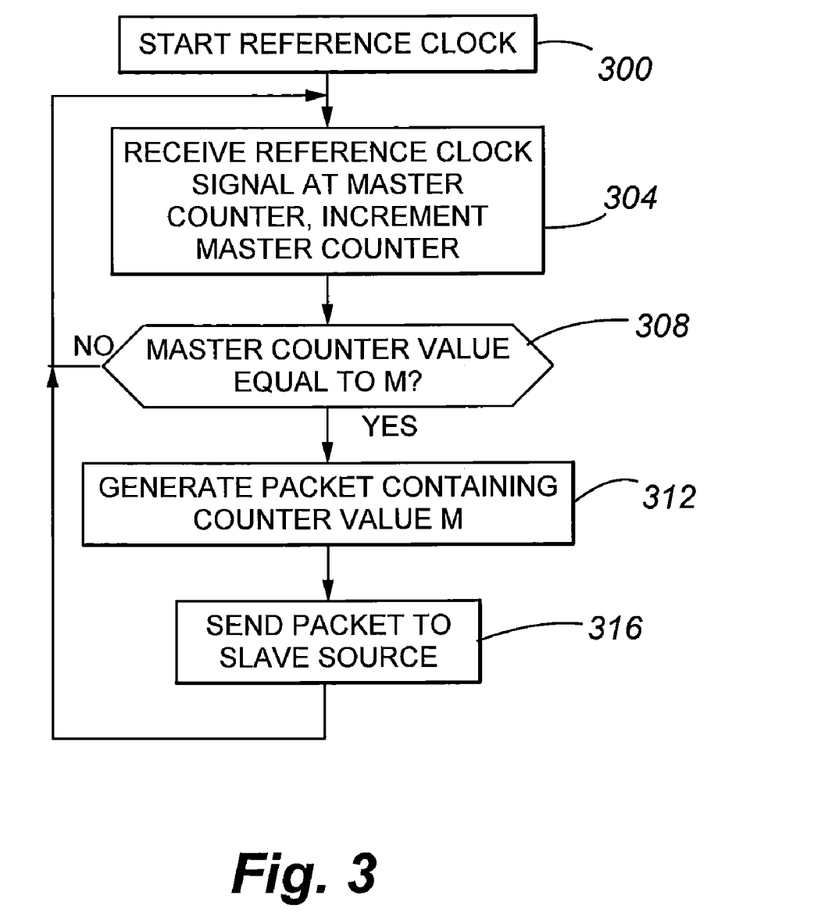
FIG. 3 is a flowchart depicting aspects of the operation of a master clock source in accordance with embodiments of the present invention.

With reference now to FIG. 3, aspects of the operation of a master clock source 104 in accordance with embodiments of the present invention are depicted. Initially, at step 300, the reference clock source 106 is started. At step 304, the reference clock signal 108 is received at the master clock source counter 204, and the master clock source counter 204 is incremented. In particular, the master clock source counter 204 is incremented for each cycle or tick of the reference clock source signal 108.

At step 308, a determination is made as to whether the value held by the master clock source counter 204 is equal to a selected count value m. In accordance with embodiments of the present invention, the count value m may be constant from count to count. Alternatively, different values of m may be applied. If the master clock source counter 204 has not reached the selected value m, the process returns to step 304, and the next cycle or tick of the reference signal 108 is counted. If the value held by the master clock source counter 204 is equal to m, a timing packet 124 containing the count value m (the master count value 132) is generated by the packet generator 208 (step 312). The timing packet 124 is then sent to the controlled clock source 112 (step 316). Provided that synchronization of the controlled clock source 112 to the reference clock source 106 associated with the master clock source 104 continues to be desired the process returns to step 304. If synchronization is no longer desired, or if the master clock source 104 is turned off, the process may end.

Figure 4:
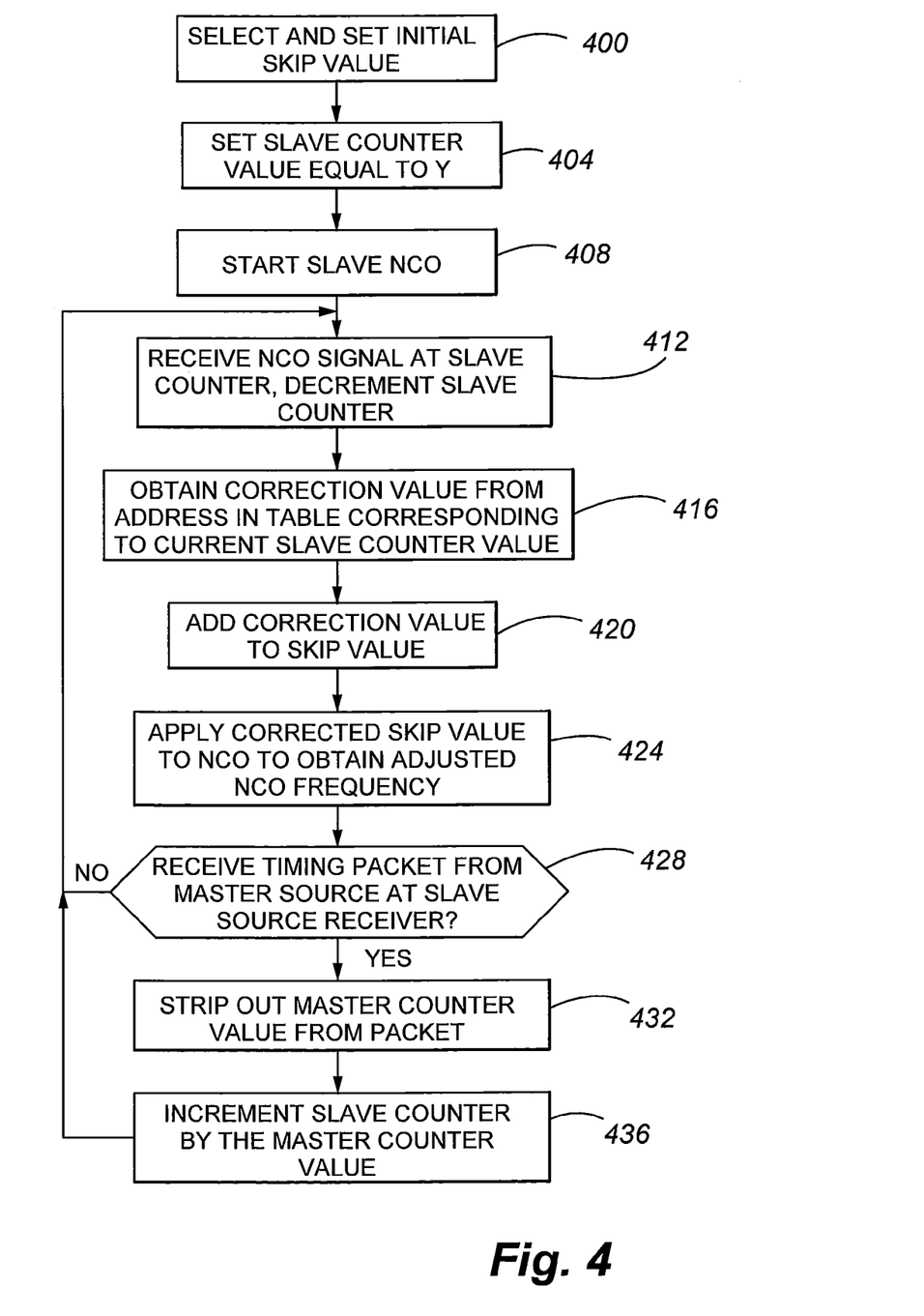
FIG. 4 is a flowchart depicting aspects of the operation of a controlled clock source in accordance with embodiments of the present invention.

With reference now to FIG. 4, aspects of the operation of a controlled clock source 112 in accordance with embodiments of the present invention are illustrated. Initially, at step 400 an initial skip value is selected and placed in the skip value register 228. In general, the initial skip value may be selected such that the controlled clock source signal 120 has a frequency that is at or near the expected frequency of the signal 108 generated by the reference clock source 106. Although selecting a skip value that produces a controlled clock source signal 120 having a frequency that is close to the expected frequency of the reference clock signal 108 will tend to result in faster synchronization of the controlled clock source signal 120 to the reference signal 108, it is not necessary to the operation of the system 100.

The controlled clock source counter 216 is set to an initial value equal to y. In accordance with embodiments of the present invention, the initial value y may be equal to one half the counter's maximum value. Although setting the value held by the counter 216 to about one half the maximum value can assist in speeding up the synchronization of the controlled clock source signal 120 to the reference clock signal 108, it is not necessary. As part of the initial steps of starting the synchronization process, the controlled source clock 220 may also be started (step 408).

At step 412, the controlled source clock signal 120 is received at the controlled clock source counter 216, and the value held by the counter 216 is decremented. A correction value may then be obtained from the address in the error correction table 224 corresponding to the current controlled clock source counter 216 value (step 416). In accordance with embodiments of the present invention, a correction value is obtained and/or applied to the skip value periodically, for example after each timing packet 124 containing a master count value 132 is received. As a further example, a correction value is obtained after a number of timing packets 124 containing a master count value 132 are received. The error correction value obtained from the error correction table 224 is then added to the skip value (step 420). The corrected skip value is then applied to the frequency generator 220 to obtain an adjusted controlled clock source signal 120 frequency (step 424).

At step 428, a determination is made as to whether a timing packet 124 from the master clock source 104 has been received at the data packet receiver 212 of the controlled clock source 112. If a timing packet 124 has not been received, the process may return to step 412. If a timing packet 124 has been received, the master counter value 132 is stripped out of the timing packet (step 432). The controlled clock source counter 216 is then incremented by the value obtained from the timing packet (step 436). Provided that synchronization of the controlled clock source signal 120 to the reference clock source signal 108 continues to be desired and/or the controlled clock source 112 has not been powered off, the process may return to step 412.

The logic in FIGS. 3 and 4 can be implemented by a logic software and/or software. In the latter case, the software is recorded in a computer readable storage medium, such as the memory of a computational component. The software is recorded in the form of computer executable instructions.

Figure 5:
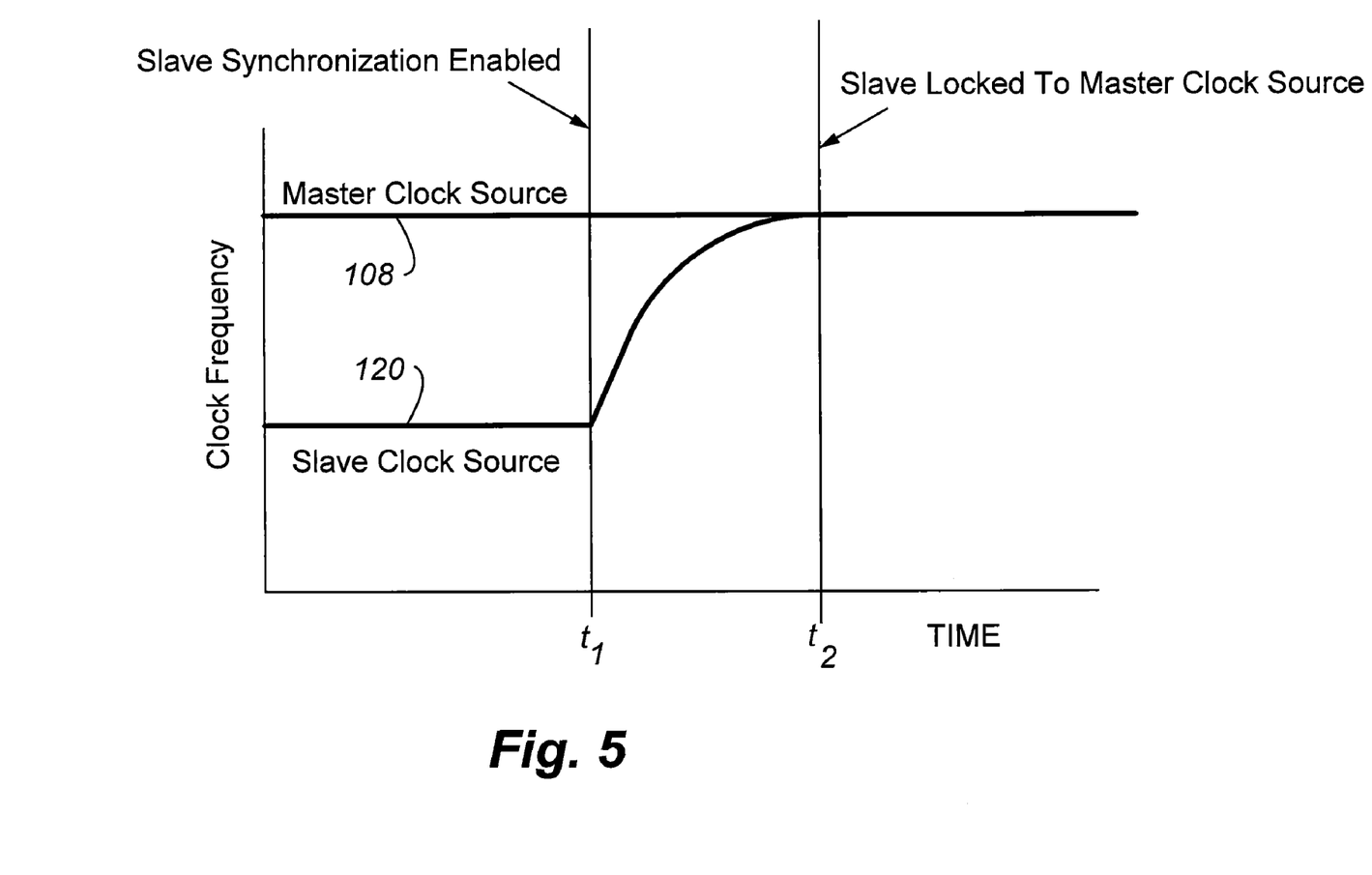
FIG. 5 is a graph depicting an example of the convergence of a controlled clock source to a master clock source in accordance with embodiments of the present invention.

With reference now to FIG. 5, a graph depicting the synchronization of a controlled clock source 112 with a master clock source 104 is shown. In particular, it can be seen that a slave or controlled clock source signal 120 may initially have a frequency, shown as line 500, that is different than the frequency of the reference clock signal 108 associated with the master clock source 104. At time $t_1$, synchronization in accordance with embodiments of the present invention is enabled. Accordingly, after time $t_1$ the frequency of the controlled source clock signal 120 converges towards the frequency of the reference clock signal 108. At time $t_2$, the frequency of the controlled clock signal 120 is locked to that of the reference clock signal 108. Furthermore, by continued operation of the synchronization system 100, any drift that may occur in the frequency of the controlled clock source signal 120 will be corrected, in order to maintain synchronization.

As can be appreciated by one of skill in the art from the description provided herein, embodiments of the present invention allow communication endpoints or devices to synchronize their clock signals to one another, even though the devices or endpoints communicate with one another using packet data communications protocols. It should further be appreciated that synchronization of two endpoints does not require the participation of an absolute reference clock signal. Instead, one device may be selected to operate as a master, and the controlled clock source may then be operated to follow the clock frequency of the other device. It should further be appreciated that embodiments of the present invention are not limited to synchronization between two endpoints or devices. For example, a master clock source 104 may provide timing packets 124 to a number of controlled clock sources 112 to allow all of those controlled clock sources 112 to synchronize to the frequency of the master clock source 104.

Although embodiments of the present invention have been described as including a device functioning as a master clock source 104 and a separate controlled clock source 112, the present invention is not so limited. For example, in connection with systems that do not have a reference clock source, but simply need to have a clock frequency that is synchronized among devices, two endpoints to a communication could function both as a master clock source 104 and a controlled clock source 112. That is, a first endpoint could transmit timing packets 124 to a second endpoint, while acting on timing packets 124 received from the second endpoint and therefore functioning as a controlled clock source 112. Furthermore, such embodiments would generally allow the clock signals of the two devices to be synchronized more quickly than if one device was providing a reference clock frequency, because both endpoints will be seeking to converge and lock their frequencies to one another at the same time.

Although embodiments of the present invention have been described in connection with the use of a correction table, the present invention is not so limited. For instance, the value held by the controlled clock source counter 216 may be used as an input to an algorithm providing a skip value modification factor.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for synchronizing devices over a packet data network, comprising:
    receiving a first master count value from a master device;
    a first one of incrementing and decrementing a controlled counter by said first master count value;
    a second one of incrementing and decrementing said controlled counter in response to detecting a clock tick output by a controlled clock;
    deriving an adjustment value from a value held by said controlled counter; and
    applying said adjustment value to said controlled clock.

2. The method of claim 1, wherein said applying said adjustment value to said controlled clock comprises applying said adjusted value to a skip value, wherein said skip value controls a frequency of said controlled clock.

3. The method of claim 1, wherein said deriving an adjustment value from said value held by said controlled counter is performed each time said controlled counter is decremented or incremented.

4. The method of claim 1, wherein said deriving an adjustment value from said value held by said controlled counter is performed periodically.

5. The method of claim 1, further comprising:
    receiving a second master count value from the master device;
    said first one of incrementing or decrementing said controlled counter by a second master count value;
    deriving an adjustment value from said adjusted controlled counter value; and
    applying said adjustment value to a skip value.

6. The method of claim 5, wherein said first master count value is equal to said second master count value.

7. The method of claim 6, wherein the master device comprises a master counter for maintaining said master count value, wherein said master count value is reset each time said first value is reached.

8. The method of claim 7, wherein said master counter is incremented by a master clock, and wherein said applying said adjustment value to said skip value causes a frequency of said controlled clock to coverage towards a frequency of said master clock.

9. The method of claim 1, wherein said deriving an adjustment value comprises applying said value held by said controlled counter as an address to a correction value included in a table of correction values.

10. The method of claim 9, wherein said table of correction values define a non-linear progression.

11. The method of claim 1, wherein said controlled clock comprises a numerically controlled oscillator.

12. The method of claim 1, wherein said first master count value is transmitted over an Internet protocol network as part of a data packet.

13. The method of claim 12, further comprising stripping said first master count value from said data packet.

14. The method of claim 2, wherein said applying said adjustment value to a skip value comprises adding said adjustment value to said skip value.

15. A synchronization method, comprising:
    receiving an output from a local clock;
    a first one of decrementing and incrementing a local counter every i ticks of said local clock;
    receiving a count value from a remote clock source;
    a second one of decrementing and incrementing said local counter by said received count value to provide an updated value;
    selecting, for the updated value, a correction value; and
    determining, from said correction value a skip value, the skip value adjusting a frequency of a local clock source signal.

16. The method of claim 15, wherein said selecting step comprises deriving a the correction value from said value held by said local counter and wherein the skip value is applied to a frequency control input of said local clock.

17. The method of claim 16, wherein said deriving a correction value comprises using one of said value held by said local counter and the i most significant bits of said value held by said local counter as an index to a correction value held in a table of correction values.

18. The method of claim 17, wherein said table of correction values describe a hyperbolic progression.

19. The method of claim 15, wherein said count value is received as part of a data packet transmitted by a device associated with said remote clock source over an Internet protocol network.

20. The method of claim 15, wherein said value held by said local counter comprises a most recent available count value.

21. The method of claim 15, wherein said first one of decrementing and incrementing said local counter every ticks of said local clock comprises decrementing, and wherein said second one of decrementing and incrementing said local counter by said received count value comprises incrementing.

22. The method of claim 15, wherein i is equal to one.

23. A computer readable storage medium comprising computer executable instructions to perform the steps of claim 15.

24. A system for synchronizing clocks, comprising:
a controlled clock source;
a data packet receiver;
a local clock source;
a skip value register containing a skip value, wherein said skip value is an input to said local clock source and controls a frequency of said local clock source;
a counter, wherein said counter receives as a first one of a negative input and a positive input an output signal from said local clock source, and wherein said counter receives as a second one of a negative input and a positive input a master count value passed to said counter by said data packet receiver;
a table of addressable correction values, wherein a one of said correction values is addressed based on a currently available value held by said counter; and
an adder, and wherein said addressed correction value is added to said skip value.

25. The system of claim 24, further comprising:
a communication network interconnected to said controlled clock source;
a master clock source, comprising:
a master clock;
a master counter, wherein said master counter is incremented every k ticks of said master clock, and wherein said master counter is reset each time it reaches a value m; and
a data packet generator, wherein a timing packet containing said value m is generated each time said master counter reaches said value m, and wherein said timing packet containing said value m is transmitted across said communication network from said data packet generator to said data packet receiver of said controlled clock source.

26. The system of claim 24, wherein said communication network comprises an Internet protocol network.

27. The system of claim 24, wherein said local clock source comprises a numerically controlled oscillator.

28. The system of claim 24, wherein said controlled clock source further comprises memory, wherein said table of addressable correction values is maintained in said memory.

29. A synchronized controlled source clock device, comprising:
means for receiving a data packet containing a master clock source count value;
means for maintaining a count value;
means for first adjusting said means for maintaining a count value in response to said master clock source count value;
means for generating a controlled source clock signal, wherein a frequency of said controlled source clock signal is responsive to a control signal;
means for second adjusting said means for maintaining said count value in response to said controlled source clock signal; and
means for altering said control signal in response to a value available from said means for maintaining a count value.

30. The device of claim 29, wherein said means for altering a control signal comprises means for storing correction values, wherein a one of said correction values is addressed based on said value available from said means for maintaining a count value.

31. The device of claim 29, wherein said means for first adjusting comprises means for adding and wherein said means for second adjusting comprises means for subtracting.

32. A computer readable storage medium comprising computer executable instructions to perform the steps of claim 1.

* * * * *